(12) United States Patent
Iacono et al.

(10) Patent No.: US 7,366,464 B2
(45) Date of Patent: Apr. 29, 2008

(54) ACCESS POINT OPERATING WITH A SMART ANTENNA IN A WLAN AND ASSOCIATED METHODS

(75) Inventors: Ana Lucia Iacono, Garden City, NY (US); Arty Chandra, Manhasset Hills, NY (US); Daniel P. Steinbach, Commack, NY (US); Inhyok Cha, Melbourne, FL (US); James C. Otto, Melbourne, FL (US); Kevin P. Johnson, Palm Bay, FL (US); Stanley Gutowski, Indialantic, FL (US); Kai Liu, Melville, NY (US); Angelo Cuffaro, Laval (CA); Janet Stern-Berkowitz, Little Neck, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 172 days.

(21) Appl. No.: 11/144,113

(22) Filed: Jun. 3, 2005

(65) Prior Publication Data
US 2005/0285803 A1 Dec. 29, 2005

Related U.S. Application Data

(60) Provisional application No. 60/577,334, filed on Jun. 4, 2004, provisional application No. 60/587,962, filed on Jul. 14, 2004.

(51) Int. Cl.
*H04B 7/14* (2006.01)
(52) U.S. Cl. .................... 455/25; 455/562.1; 455/41.2; 455/115.1
(58) Field of Classification Search ............. 455/562.1, 455/575.7, 550.1, 63.4, 41.2, 276.1, 454, 455/67.11, 115.1, 25; 370/334; 343/702, 343/883
See application file for complete search history.

(56) References Cited

U.S. PATENT DOCUMENTS

| | | | |
|---|---|---|---|
| 3,846,799 A | 11/1974 | Gueguen | 343/833 |
| 5,905,473 A | 5/1999 | Taenzer | 343/834 |
| 2004/0224637 A1* | 11/2004 | Silva et al. | 455/63.4 |
| 2005/0075141 A1* | 4/2005 | Hoffmann et al. | 455/562.1 |

(Continued)

OTHER PUBLICATIONS

Ohira et al., Electronically Steerable Passive Array Radiator Antennas for Low-Cost Analog Adaptive Beamforming, 0-7803-6345-0/00, 2000, IEEE.
Scott et al., Diversity Gain From a Single-Port Adaptive Antenna Using Switched Parasitic Elements Illustrated with a Wire and Monopole Prototype, IEEE Transactions on Antennas and Propagation, vol. 47, No. 6, Jun. 1999.

(Continued)

*Primary Examiner*—Tan Trinh
(74) *Attorney, Agent, or Firm*—Allen, Dyer, Doppelt, Milbrath & Gilchrist, P.A.

(57) ABSTRACT

An access point operates in an 802.11 wireless communication network communicating with a client station, and includes a smart antenna for generating directional antenna beams and an omni-directional antenna beam. An antenna steering algorithm scans the directional antenna beams and the omni-directional antenna beam for receiving signals from the client station. The signals received via each scanned antenna beam are measured, and one of the antenna beams is selected based upon the measuring for communicating with the client station. The selected antenna beam is preferably a directional antenna beam. Once the directional antenna beam has been selected, there are several usage rules for exchanging data with the client station. The usage rules are directed to an active state of the access point, which includes a data transmission mode and a data reception mode.

47 Claims, 7 Drawing Sheets

U.S. PATENT DOCUMENTS

2005/0215266 A1* 9/2005 Tsien et al. .................. 455/454
2005/0255892 A1* 11/2005 Wong et al. ............. 455/562.1
2005/0282553 A1* 12/2005 Lastinger et al. ........... 455/450
2006/0234789 A1* 10/2006 Tarokh et al. ........... 455/575.7
2006/0292991 A1* 12/2006 Abramov et al. .......... 455/63.4

OTHER PUBLICATIONS

King, The Theory of Linear Antennas, pp. 622-637, Harvard University Press, Cambridge, Mass., 1956.
Lo et al., Antenna Handbook: Theory, Applications and Design, pp. 21-38, Van Nostrand Reinhold Co., New York, 1988.

* cited by examiner

ACCESS POINT OPERATING WITH A SMART ANTENNA IN A WLAN AND ASSOCIATED METHODS

RELATED APPLICATION

This application claims the benefit of U.S. Provisional Application Ser. Nos. 60/577,334 filed Jun. 4, 2004 and 60/587,962 filed Jul. 14, 2004, the entire contents of which are incorporated herein by reference.

FIELD OF THE INVENTION

The present invention relates to the field of wireless communications, and more particularly, to an antenna steering algorithm for an access point operating with a smart antenna in an 802.11 wireless local area network (WLAN).

BACKGROUND OF THE INVENTION

A wireless local area network (WLAN) uses radio waves rather than wires to communicate between nodes. WLANs are flexible communication systems seen as an alternative to, or an extension of wired LANs. An access point is a hardware device that acts as a communication hub for users of a wireless device to connect to the LAN. Access points are important for extending the physical range of service in which a wireless user has access to the LAN. Access points also affect the throughput of the networks.

Wireless users are also known as client stations. Example client stations are personal computers operating with a wireless network card. The wireless network card may be compatible with the 802.11 standard, for example. An access point includes an antenna for sending forward link radio frequency signals to the client stations. The access point is also responsible for receiving reverse link radio frequency signals transmitted from each client station.

The most common type of antenna used to transmit and receive signals at an access point is an omni-directional monopole antenna. This type of antenna comprises a single wire or antenna element that is coupled to a transceiver within the access point. The transceiver receives reverse link signals transmitted from a client station, and transmits forward link signals to that client station.

The transmitted signals sent from a monopole antenna are omni-directional in nature. That is, the signals are sent with the same signal strength in all directions in a generally horizontal plane. Reception of signals with the monopole antenna element is likewise omni-directional. A monopole antenna does not differentiate in its ability to detect a signal in one direction versus detection of the same or a different signal coming from another direction. As a result, the antenna gain of an omni-directional antenna is generally low, resulting in a reduced range in which client stations can access the network via the access point. Moreover, the throughput of the network is adversely affected by low gain omni-directional antennas.

SUMMARY OF THE INVENTION

In view of the foregoing background, it is therefore an object of the present invention to increase the range between an access point and client stations and to increase network throughput.

This and other objects, features, and advantages in accordance with the present invention are provided by a method for operating an access point in an 802.11 wireless communication network communicating with at least one client station, with the access point comprising a smart antenna for generating antenna beams including a plurality of directional antenna beams and an omni-directional antenna beam.

The method comprises scanning the plurality of directional antenna beams and the omni-directional antenna beam for receiving signals from the at least one client station, measuring the signals received via each scanned antenna beam, and selecting one of the plurality of antenna beams based upon the measuring for communicating with the at least one client station.

The access point comprises an antenna steering algorithm for selecting the best antenna pattern to be used with each specific client station. The best antenna beam can be any of the directional antenna beams or the omni-directional antenna beam.

To determine the best antenna beam, received signal strength indicators (RSSI) or signal-to-noise ratios are metrics used to evaluate beam quality. These metrics are chosen because they are easily available to the MAC layer in the access point. Moreover, there is a high degree of correlation between the RSSI values/signal-to-noise ratios and the throughput experienced by the client stations.

The antenna steering algorithm runs independently for each associated client station. The algorithm state and the metrics needed by the algorithm are kept separately for each client station. The algorithm only runs for clients that are associated with that access point.

When the client station joins the access point, after the client station performs authentication and association, the access point scans the antenna beams to choose the best beam. After the best beam is selected, and while the client station is connected to the access point, the access point will continuously evaluate the beam quality to determine if the selected beam is no longer the best beam, in which case a re-scanning and re-measuring will be performed.

If the selected antenna beam is a directional antenna beam, and the WLAN is in a contention free period (CFP), then the following steps will be used to determine when to perform the re-scanning and re-measuring. A plurality of measurements are performed for signals received via the selected directional antenna beam from the at least one client station, and a switch is made to the omni-directional antenna beam in order to perform a plurality of measurements for signals received from the at least one client station. The measured signals for the omni-directional antenna beam are compared to the measured signals for the selected directional antenna beam, and the re-scanning and the re-measuring of the antenna beams are performed based upon the comparing.

During the connection, the access point also decides when to use the selected (best) beam versus the omni-directional antenna beam. The access point should use the selected beam as often as possible, but it is also important to avoid the hidden node problem.

The scanning and measuring may be repeated n times for each antenna beam, and if one of the antenna beams does not receive signals from the at least one client station at least a portion of the n times, then that antenna beam is ignored during a remainder of the scanning and measuring.

The scanning and measuring may be repeated a plurality of times for each antenna beam, and the method may further comprise calculating for each scanned antenna beam an average measurement of the plurality of measurements associated therewith. The selecting may then be based upon the average measurements.

In one approach, the scanning may comprise selecting one of the plurality of antenna beams to be scanned, transmitting a request-to-send (RTS) packet to the at least one client station, and receiving a clear-to-send (CTS) packet via the selected antenna beam from the at least one client station. The transmitting, selecting and receiving are repeated for the other antenna beams. The RTS packet may be transmitted via the omni-directional antenna beam. The transmitting and selecting may be repeated n times for each antenna beam, and if one of the antenna beams does not receive the CTS packet from the at least one client station at least a portion of the n times, then that antenna beam is ignored during a remainder of the transmitting and selecting. In another approach, the RTS and CTS packets may be replaced with dummy packets and 802.11 acknowledgements.

The method may further comprise the following before the scanning is performed: selecting the omni-directional antenna beam for receiving signals from the at least one client station, measuring the signals received via the omni-directional antenna beam, and comparing the measured signals to a scan threshold, and if the measured signals are less than the scan threshold, then performing the scanning.

Once an antenna beam has been selected, which is preferably a directional antenna beam, there are several usage rules for exchanging data with the client station. The usage rules are directed to an active state of the access point, which includes a data transmission mode and a data reception mode.

In the data transmission mode, the access point may transmit a CTS-to-self packet (in the omni-directional antenna beam) prior to transmitting data to the client station using the selected antenna beam. Alternatively, the access point may transmit an RTS packet (in the omni-directional antenna beam) prior to transmitting data to the client station using the selected antenna beam. If the transmitted data is fragmented, then the access point may transmit a CTS-to-self packet between fragments.

In the data reception mode, if an RTS packet is received from the client station, then the access point may transmit a CTS packet, and switch to the antenna beam selected for communicating with the client station for receiving data therefrom. If the selected antenna beam comprises a directional antenna beam for receiving the data, and if the received data is fragmented, then the access point transmits an acknowledgment using the omni-directional antenna beam between receiving the fragments. The acknowledgement may also be transmitted using a directional antenna beam.

In addition, there are certain conditions when the smart antenna is forced to the omni-directional antenna beam after having selected a preferred directional antenna. For instance, if the access point receives more than a predetermined number of consecutive data packets from the client station in the selected directional antenna beam, then the smart antenna may be switched between the selected directional antenna beam and the omni-directional antenna beam for alternating reception of additional consecutive data packets. Signals received using the omni-directional antenna beam are measured and compared to the signals measured in the directional antenna beam. Another condition is when an NAV associated with the client station expires, then the access point switches to the omni-directional antenna beam.

Another aspect of the present invention is directed to an access point for operating in an 802.11 wireless communication network as described above. The access point may comprise a smart antenna, a beam switching unit coupled to the smart antenna, and a transceiver coupled to the beam switching unit. The transceiver may comprise a measurement unit for measuring the received signals. An antenna steering algorithm module runs an antenna steering algorithm for performing the steps as described above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
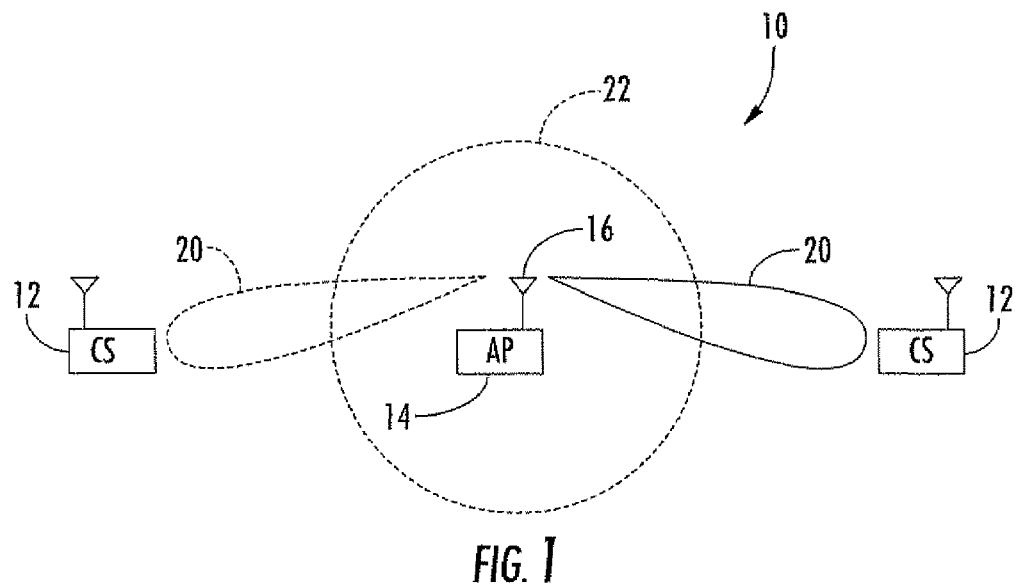
FIG. 1 is schematic diagram of an 802.11 wireless local area network (WLAN) including client stations, and an access point operating with a smart antenna in accordance with the present invention.
Figure 2:
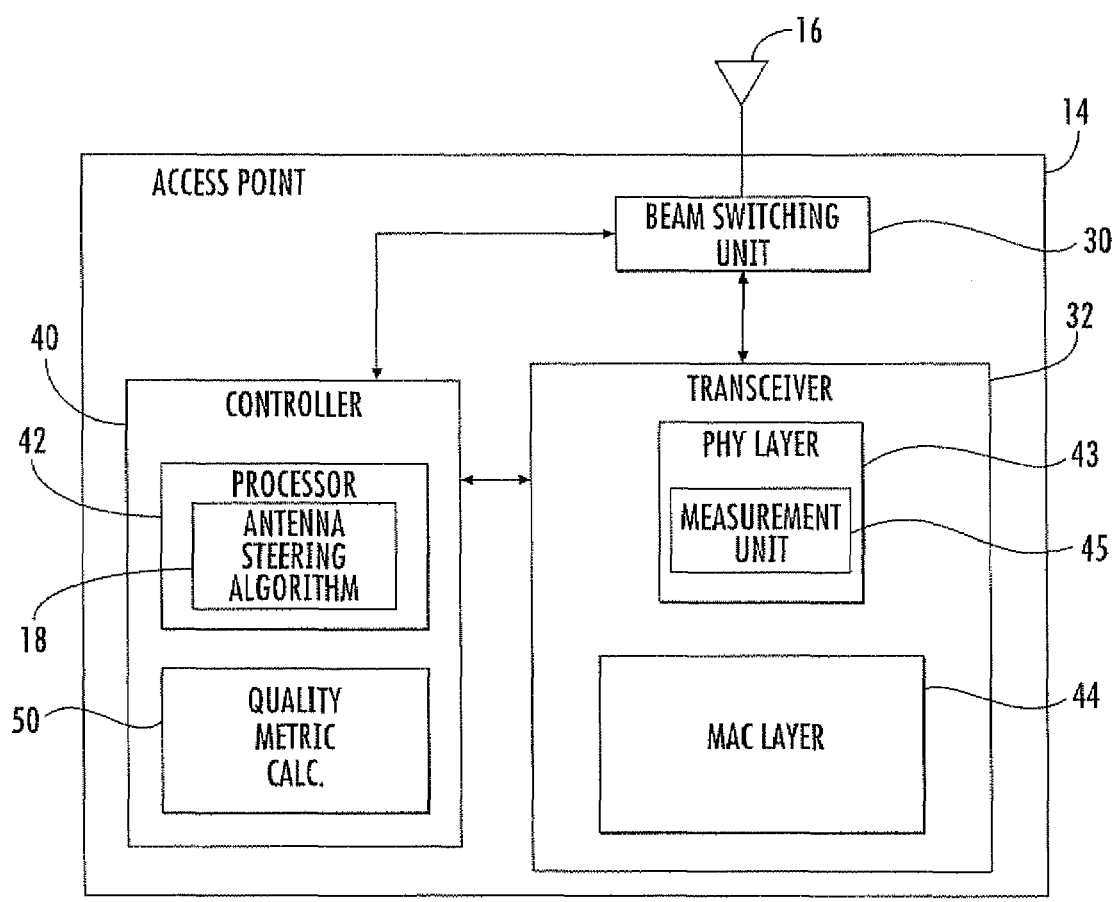
FIG. 2 is a block diagram of the access point illustrated in FIG. 1.

Referring initially to FIGS. 1 and 2, an 802.11 wireless local area network (WLAN) 10 includes client stations 12, and an access point 14 operating with a subscriber based smart antenna 16 in accordance with the present invention. The smart antenna 16, which will also be referred to as a switched beam antenna, generates a plurality of antenna beams in response to an antenna steering algorithm 18. The antenna beams generated by the smart antenna 16 include directional antenna beams 20 and an omni-directional antenna beam 22.

The access point 14 includes a beam switching unit 30 connected to the smart antenna 16, and a transceiver 32 connected to the beam switching unit. A controller 40 is connected to the transceiver 32 and to the beam switching unit 30. The controller 40 includes a processor 42 for executing the antenna steering algorithm 18. Alternatively, the antenna steering algorithm 18 may operate on an 802.11 PHY/MAC chipset instead of the illustrated processor 42. The PHY/MAC chipset includes the illustrated PHY layer 43 and the MAC layer 44. Regardless of the processor executing the antenna steering algorithm 18, the algorithm utilizes information provided by what is typically called the upper MAC or MAC management portion of the MAC software, either via MAC abstraction available for access by the external host processor 42 or on the PHY/MAC chipset.

The use of directional antenna beams 20 improves the throughput of the WLAN 10 and increases the communication range between the access point 14 and the client stations 12. A directional antenna beam 20 provides a high signal-to-noise ratio in most cases, thus allowing the link to operate at higher data rates. The PHY data rates for 802.11b links are 1, 2, 5.5, and 11 Mbps, and the rates for 802.11a are 6, 9, 12, 18, 24, 36, 48 and 54 Mbps. The 802.11g devices support the same data rates as 802.11a devices as well as the rates supported by 802.11b rates.

The antenna steering algorithm 18, as will be discussed in greater detail below, is for 802.11 WLAN access points. The algorithm selects antenna beams based on computing and tracking of certain quality metrics obtained from the MAC layer management entity (MLME) and the physical layer management entity (PLME). Signals received by the smart antenna 16 from the client stations 12 are measured by a measurement unit 45 in the physical layer 43. A quality metric calculator 47 in the controller 40 is for determining quality metrics based upon the measured signals.

Even though an 802.11 WLAN is discussed with respect to the antenna steering algorithm 18, the algorithm may be adapted to other types of local area networks, as readily appreciated by those skilled in the art. Although the core logic of the algorithm will be common to an implementation on a PHY/MAC chipset or on the illustrated external host processor 42, there can be differences in performance of the antenna steering algorithm 18 depending on the type of implementation.

For example, differences could exist between the two types of implementation regarding how fast some of the metrics can be computed, which could again result in differences in performance. The antenna steering algorithm 18, however, is designed with sufficient parametrization such that a single description can be applied to both types of implementation.

The antenna steering algorithm 18 decides which antenna beam 20, 22 to use at any given time. The access point 14 serves multiple client stations 12 in a cell, and these client stations are located in different positions. The access point 14 determines which antenna beam 20, 22 is the best one to select for communicating with each client station 12, and then appropriately selects that antenna beam.

The antenna steering algorithm 18 selects an antenna beam 20, 22 based on signal quality metrics available from the physical layer 43, upon receiving signals from each client station 12. For most broadcast and all control frames, the access point 14 generally uses an omni-directional antenna beam 22 and the lowest available data rate to insure that all client stations 12 can receive them. Directional antenna beams 20 may not always increase the coverage area of the network 10 but may increase the data rate for data frames sent to the client stations 12.

The client stations 12 are personal computers operating with a wireless network card, for example, and primarily use omni-directional antennas. The antenna steering algorithm 18 is resident in the access point 14 to support operation with various vendor station equipment equipped with omni-directional antennas.

The illustrated smart antenna 16 used by the access point 14 may be a delta antenna that provides six directional antenna beams 20 (i.e., N=6), plus and an omni-directional antenna beam 22. At an operating frequency of 2.44 GHz, average gain of the omni-directional antenna beam 22 is about 0.50 dBi, for example, whereas the average gain for the directional antenna beams 20 is about 5.0 dBi, for example. The smart antenna 16 may also be a trident antenna that provides two directional antenna beams 20 (i.e., N=2), plus and an omni-directional antenna beam 22.

The antenna steering algorithm 18 is responsible for selecting the best antenna beam 20, 22 to be used with each specific client station 12. The best antenna beam can be any of the N directional antenna beams 20 or the omni-directional antenna beam 22. For example, for a trident antenna N=2, and for a delta antenna N=6. To determine the best antenna beam, the received signal strength indicator (RSSI) or the signal-to-noise ratio may be the selected metrics used to evaluate antenna beam quality. These metrics are chosen because they are easily available to the MAC in most implementations. Moreover, there is a high degree of correlation between the RSSI values/signal-to-noise ratios and the throughput experienced by each client station 12.

The antenna steering algorithm 18 runs independently for each client station 12, and the algorithm state and the metrics needed by the algorithm are separately kept for each client station. When a client station 12 joins the access point 14 after the client station performs authentication and association, the access point then scans all antenna beams 20, 22 to choose the best-beam. After the best beam is selected, and while the client station 12 is connected to the access point 14, the access point will continuously evaluate the beam quality to determine if the selected antenna beam is no longer the best beam, in which case a re-scanning will be performed.

During the connection, the access point 14 decides when to use the selected (best) directional antenna beam 20 versus the omni-directional antenna beam 22. The access point 14 uses the selected beam as often as possible, but it is also important to avoid the hidden node problem, as will be discussed in greater detail below.

Figure 3:
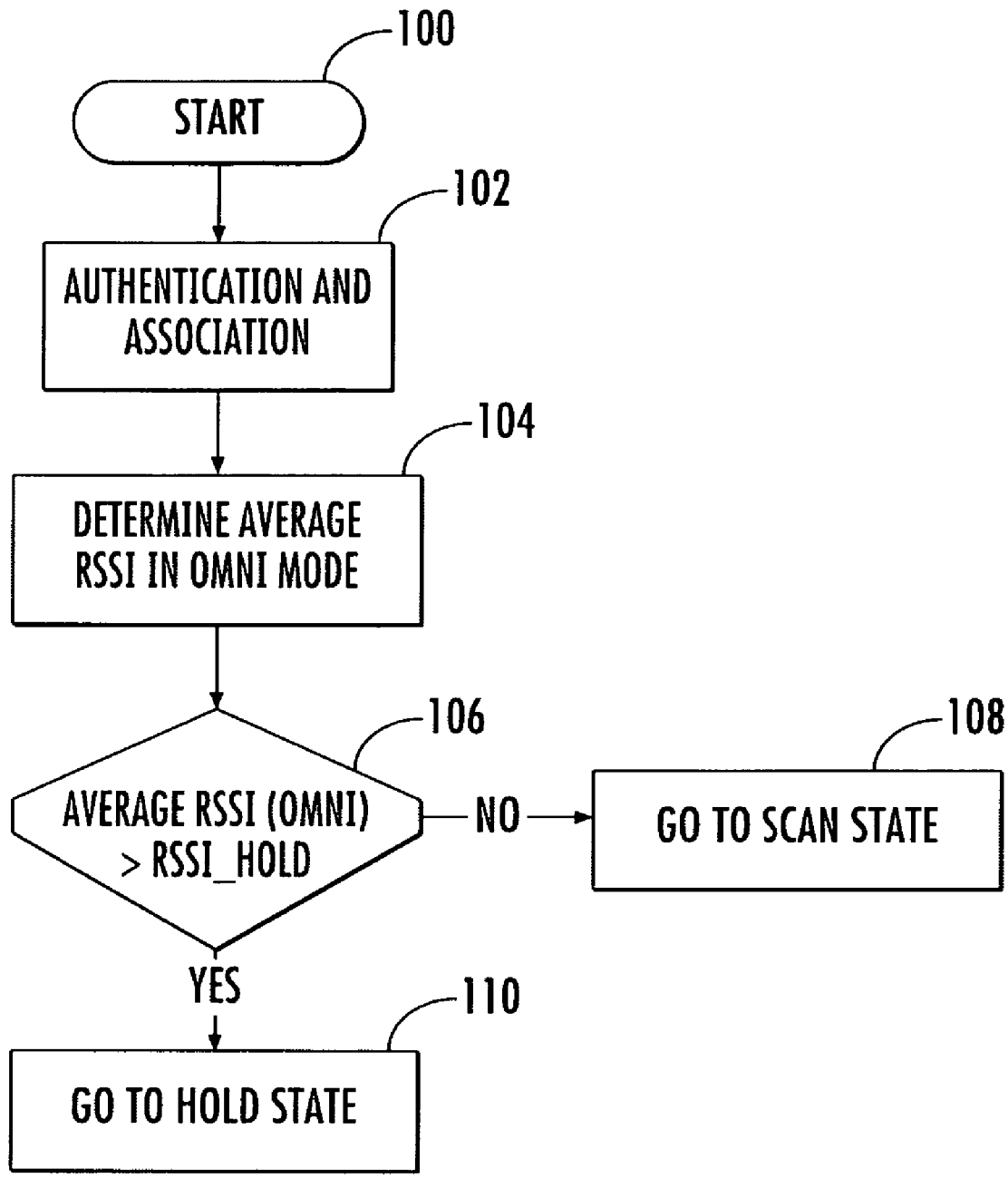
FIG. 3 is a flow chart illustrating an initial state of the antenna switching algorithm in accordance with the present invention.

Referring now to FIG. 3, the initial state of the antenna switching algorithm 18 will be discussed. From the start (Block 100), an initial state first involves authentication and association. When the client station 12 joins the access point 14, the client station performs authentication and association in Block 102. During this time, the smart antenna 16 is positioned in the omni-directional mode. The access point 14 measures the RSSI or SNR of the signals received by the client station 12 during this time in Block 104. The total number of RSSI or SNR measurements obtained during this time is at least two: one from the authentication message and one from the association message.

Based on the measurements received, the access point 14 determines the average RSSI, $\overline{RSSI_{Initial}}(omni)$, as follows:

$$\overline{RSSI_{Initial}(omni)} = \frac{1}{M_n} \sum_{i=1}^{M_n} RSSI(i, omni)$$

where $M_n$ is the total number of RSSI measurements available ($M_n \geq 2$) and RSSI (i,omni) is the i-th RSSI measurement received in the omni-directional antenna beam 22. Even though the illustrated equations (as well as the equations that follow) are based on RSSI values, the equations may be re-written with signal-to-noise ratios, as readily appreciated by those skilled in the art.

After the initial state, the smart antenna 16 enters either a scan state or a hold state based upon a decision made in Block 106. Smart antenna gains are most significant when the client station 12 is further way from the access point 14.

For very high signal strengths, smart antenna 16 benefits are not very large. This is because the client station 12 is already being served with very high data rates at very low error rates, so the improvements due to usage of the smart antenna 16 are very small. Thus, if the average RSSI measured in omni-directional antenna beam 22 is very high, the antenna steering algorithm 18 will put the client station 12 in a hold state (Block 110), and the client station will be served with the omni-directional antenna beam.

Hence, if $\overline{RSSI_{Initial}(omni)} > RSSI_{Hold}$, then the omni-directional antenna beam 22 is chosen for that client station 12, and the access point goes into the hold state. Otherwise, the client station 12 goes to the scan state in Block 108.

If the access point 14 is going to the scan state, it may wait a predetermined amount of time before performing the scanning so that the client station 12 can perform its own scanning if equipped with a smart antenna. In the scan state, all averages are reset when entering this state. The scan state is the state where the access point 14 scans the antenna beams 20, 22 and selects the best antenna beam to be used for communication with a specific client station 12. All antenna beams 20, 22 are scanned, including the omni-directional antenna beam. During this state, if there is data to be sent/received to/from the client station 12, it may be done using the omni-directional antenna beam 22.

During the scan state, each antenna beam 20, 22 is visited $M_{scan}$ times, and at each visit, the access point 14 measures the RSSI in the visited beam. This is the beam scanning procedure. After each beam is visited $M_{scan}$ times, the RSSI measurements are averaged. Then, the beam classification procedure is used to select the best antenna beam and determine the beam candidate set.

Figure 4:
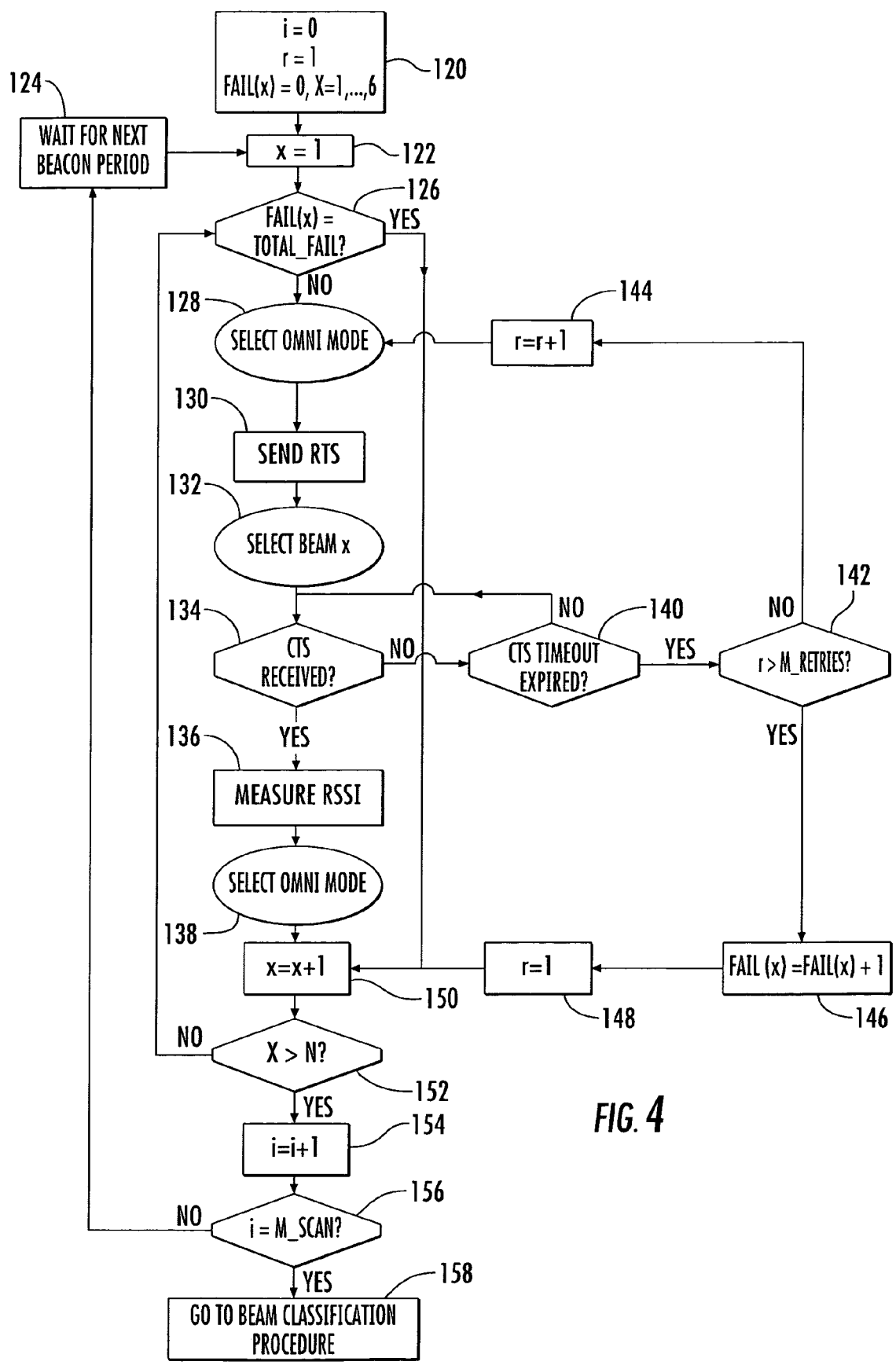
FIG. 4 is a flow chart illustrating the beam scanning procedure associated with the scan state in accordance with the present invention.

Referring now to FIG. 4, the beam classification procedure associated with the scan state for the antenna steering algorithm 18 will be discussed. The beam scanning procedure is the procedure responsible for scanning all the beams/antenna patterns and collecting measurements in every pattern during a period of time. The initial parameters for the beam scanning procedure are set in Blocks 120 and 122.

At every beacon period (Block 124), one measurement will be collected for every antenna beam 20, 22 as follows. At the beginning of the beacon period the beam scanning procedure is triggered, and the access point 14 starts with a first antenna beam and measures RSSI in the first pattern; then moves to a second antenna beam and measures RSSI in the second pattern, and so on, until the access point measures all N antenna beams in that beacon period. The procedure is then repeated at the next beacon period. The procedure is repeated for $M_{scan}$ beacon periods. In other words, at every beacon period the antenna 16 will "rotate" once, visiting every antenna beam 20, 22. This is done to take measurements that are far enough apart to avoid fades caused by multipath.

Since the client stations 12 do not transmit beacons, the access point 14 does not have beacons to measure the RSSI. Hence, in order to perform a measurement in a specific antenna beam, the access point 14 sends an RTS packet (Block 130) to the desired client station 12. The RTS packet is sent with the omni-directional antenna beam 22 (Block 128) so that every client station 12 can hear the transmission, thus reducing the probability of collisions in the CTS packet.

Optionally, this packet may be sent using the directional antenna beam 20 that is being measured. After sending the RTS, the access point 14 will switch to the antenna beam being scanned (Block 132). The desired client station 12 will respond with a CTS packet. This packet will be received by the access point 14 in the beam being scanned (Block 134). The access point 14 will measure the RSSI for the CTS packet (Block 136), and then go back to the omni mode (Block 138).

According to 802.11 rules, if the RTS is sent and the CTS is not received after a CTSTimeout interval (Block 140), the access point 14 tries again after a backoff procedure. The same rules will be kept, but the maximum number of retries will be $M_{Retries}$. After the access point 14 retries $M_{Retries}$ times (Block 142), it will move on to the next beam. The appropriate parameters are incremented in Blocks 144, 146, 148 and 150.

During implementation it is important to make sure that these rules are coordinated with the MAC transmissions. It is necessary to be able to differentiate between an RTS packet being sent before a data frame and an RTS packet being sent to perform beam scanning, since the number of retries is different.

In case the transmission of RTS for beam scanning purposes becomes an issue with specific implementations, a small data packet may be used. In this case, the scanning procedure would be the same as the one with RTS/CTS, except that the RSSI measurement would be performed in the ACK. It is necessary to send a packet that requires an acknowledgement. Instead of a CTS being sent, any "dummy" packet that requires an acknowledgment can be used instead. A dummy packet can be a packet with a MAC header but no data/payload, for example. The CTS/dummy packets may be sent using the omni-directional antenna beam, or optionally, these packets can be sent using the directional antenna beam that is being monitored. After the decision in Block 156 has been made indicating that all the beams have been scanned, the process proceeds to the beam classification procedure in Block 158.

A beam is said to be unavailable in a visit if, during the visit, no measurements are obtained. If the beam is unavailable for a given number of times, Total_Fail, then that specific beam is not measured in this scan anymore (Block 126).

If a buffer in the access point 14 has too many packets, then the scanning procedure should not be run. This is to guarantee that the system throughput performance is not affected by the scanning procedure. The packets for scanning are only sent when the network 10 is lightly loaded. Lightly loaded is defined to be when the access point buffer occupancy is less than $Buffer_{Threshold}\%$ of the total buffer size.

Moreover, for a given access point 14, the number of scans allowed per beacon period is limited to Max_scan (Block 156) in order to avoid overload. If the number is exceeded, the scan of this client station 12 is not performed. In both cases, the client station 12 should remain in this state, until the scan can be successfully completed. Meanwhile, the omni-directional antenna beam 22 is used to transmit the data packets. Prior to Block 156, a decision is made as to whether all the antenna beams have been examined (Block 152), followed by incrementing the corresponding parameter in Block 154.

If one full "rotation" cannot be completed before the next beacon period starts, then that beacon period will be skipped in the next scan. For example, assume that the beam scanning procedure is triggered for the first time at beacon period 1, and assume that the system is congested and the scanning is delayed and it is only completed after beacon period 2 starts. In this case, the next scanning will be done only at beacon period 3. In other words, beacon period 2 is skipped. This means that the beam scanning procedure may take longer than $M_{scan}$ beacon periods.

Figure 5:
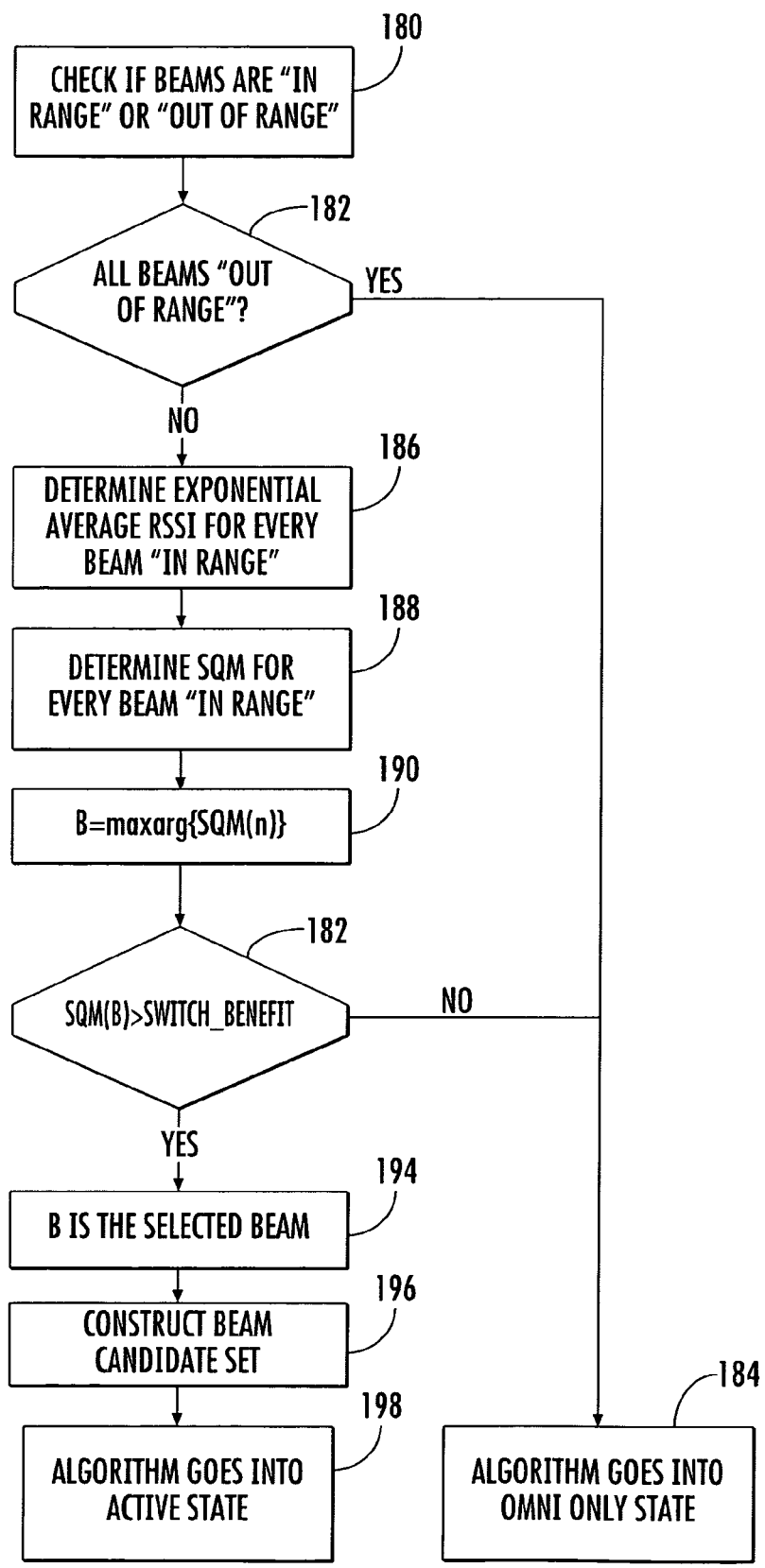
FIG. 5 is a flow chart illustrating in greater detail the beam classification procedure referenced in FIG. 4.

The beam classification procedure will now be discussed with reference to FIG. 5. For the best beam selection, let $M_n$ be the total number of RSSI measurements available in beam n after performing beam scanning, i.e., after visiting every beam $M_{scan}$ times. Beam n is classified as follows. If $M_n < M_{required}$, then beam n is considered to be "out of range". Otherwise, beam n is said to be "in range" (Block 180).

If all beams are determined to be "out of range" (Block 182), then the omni-directional antenna beam 22 is selected in Block 184. The access point 14 is put in an omni-only state. Otherwise, the antenna beams that are "in range" are classified as follows.

In Block 186, let RSSI (i,n) be the i-th RSSI measurement in beam n. At every time a new RSSI measurement is collected for beam n, the long-term exponential average is computed as follows:

$$\overline{RSSI_{long}}(1, n) = RSSI(1n,), \text{ and}$$

$$\overline{RSSI_{long}}(i,n) = \alpha_{long} \times \overline{RSSI_{long}}(i-1, n) + (1-\alpha_{long}) \times RSSI(i,n), \text{ for } i=2,3,\ldots M_n$$

Instead of an exponential average, any other type of average may be used, such as a simple average or a medium.

A signal quality metric (SQM) is then determined for every directional beam in Block 188, i.e., in range:

$$SQM(n) = \overline{RSSI_{long}}(M_n, n) - \overline{RSSI_{long}}(M_{omni}, omni)$$

The signal quality metric is determined by the quality metric calculator 50 in the controller 40. Let beam B be the beam with maximum SQM (Block 190):

$$B = \max_n \arg\{SQM(n)\}$$

If SQM(B)>Switch_Benefit (Block 192), then the best beam is beam B (Block 194), which is part of the constructed beam candidate set in Block 196, and the client station 12 goes to an active state in Block 198. Otherwise, the omni-directional antenna beam is selected in Block 184 and the client station 11 is put into the omni-only state.

As mentioned above, an antenna beam is said to be unavailable in a visit if, during the visit, no measurements are obtained. If the antenna beam is unavailable for a given number of times, Total_Fail, then that specific beam is not measured in this scan anymore. Because the number of measurements required is $M_{required}$, and the number of times the algorithm will scan each beam is $M_{scan}$, then if a beam is unavailable for ($M_{scan} - M_{required}+1$) visits, that beam will be considered "out of range". Thus, Total_Fail is defined as follows:

$$Total\_Fail = M_{scan} - M_{required}+1$$

If the client station 12 is going to an active state, then the access point 14 will create a beam candidate set for that client station with (at most) Nc best beams: "out of range" beams are not included in the beam candidate set, and omni-directional antenna beams and the selected beam (beam B) are included in the beam candidate set.

In the hold state, all averages are reset when entering this state. If the access point 14 is in the hold state, it is because the signal strength in the omni-directional antenna beam is very high, and the smart antenna benefits are not very high.

During the hold state, the access point 14 will measure the RSSI in the omni-directional antenna beam 22 and determine the long-term exponential average RSSI as follows:

1) Measure RSSI in the first packet received and determine the initial average value, as follows:

$$\overline{RSSI_{long}}(1, omni) = RSSI(1, omni)$$

2) Continue measuring RSSI in every packet received. After a measurement is received, the new average value is determined as follows:

$$\overline{RSSI_{long}}(i,omni) = \alpha_{long} \times \overline{RSSI_{long}}(i-1,omni) + (1-\alpha_{long}) \times RSSI(i,omni)$$

In this step, instead of an exponential average, any other type of average may be used, such as a simple average or a medium.

the acknowledgement may also be transmitted using a directional antenna beam.

3) If $\overline{RSSI_{long}}(i,omni) \leq RSSI_{NotHold}$ for at least $Meas_{NotHold}$ measurements and at least $Time_{NotHold}$ seconds, then the long-term exponential average is reset and the client station 12 is sent to the scan state.

The condition on time elapsed ($Time_{NotHold}$) is event driven, where the event is the receipt of a measurement from the physical layer 43. In other words, the access point 14 will only check if the time elapsed is greater than the specific threshold ($Time_{NotHold}$) when a measurement is received. This guarantees that the measurements are spread over the entire time interval.

In the omni-only state, the long-term and short-term average values calculated in the scan state are used as initial values for the calculations. During the omni-only state, the access point 14 will only use the omni-directional antenna beam 22 to communicate with the client station 12. The algorithm 18 is in this mode when the best antenna beam is the omni-directional antenna beam 22.

During the omni-only state, the following are performed:
1) Measure RSSI in every packet received.
2) After a measurement is received, determine the new long-term and short-term exponential average value as follows:

Long-Term Exponential Average:

$$\overline{RSSI_{long}}(i,omni) = \alpha_{long} \times \overline{RSSI_{long}}(i-1,omni) + (1-\alpha_{long}) \times RSSI(i,omni)$$

Short-Term Exponential Average:

$$\overline{RSSI_{short}}(i,omni) = \alpha_{short} \times \overline{RSSI_{short}}(i-1,omni) + (1-\alpha_{short}) \times RSSI(i,omni)$$

3) If $\overline{RSSI_{short}}(i,omni) < \overline{RSSI_{long}}(i,omni) - Thres_{ShortVsLong}$ for at least $Meas_{ShortvsLong}$ measurements and at least $Time_{ShortvsLong}$ seconds, then the long term and short term exponential average values are reset and the client station 12 is sent to the scan or re-scan state.

For any given client station 12, the interval between scans must be greater than a Scan_Interval. If the scan is triggered, but the last scan or rescan was completed less than Scan_Interval beacon frames ago, then the scan is not performed and the client station 12 remains in the omni-only state. If, after Scan_Interval beacons elapse, the condition above still holds, then the long-term and short term exponential average values are reset and the client is sent to the scan state.

4) If $\overline{RSSI_{long}}(i,omni) < RSSI_{Hold}$ for at least $Meas_{Hold}$ measurements and at least $Time_{Hold}$ seconds, then the long term and the short term exponential averages are reset and the client station 12 is sent to a hold state.

The conditions on time elapsed (Time$_{Hold}$, Time$_{ShortvsLong}$) are event driven, where the event is the receipt of a measurement from the physical layer 43. In other words, the access point 14 will only check if the time elapsed is greater than the specific threshold (Time$_{Hold}$, Time$_{ShortvsLong}$) when a measurement is received. This guarantees that the measurements are spread over the entire time interval.

In the active state, the long term and short-term average values calculated in the scan state are used as initial values for these calculations. During the active state, the access point 14 monitors the omni-directional antenna beam 22 and the selected directional beam 20 (beam B). The access point 14 measures RSSI in the omni-directional antenna beam 22 and in beam B, and determines the long term and short term exponential average RSSI for both antenna patterns, as follows:

1) Measure RSSI in every packet received.
2) After a measurement is received, determine the new long term and short term exponential average value, as follows:

Long-Term Exponential Average:

$$\overline{RSSI_{long}}(i,n) = \alpha_{long} \times \overline{RSSI_{long}}(i-1, n) + (1-\alpha_{long}) \times RSSI(i,n), \text{ for } n=B, \text{omni}$$

Short-Term Exponential Average:

$$\overline{RSSI_{short}}(i,n) = \alpha_{short} \times \overline{RSSI_{short}}(i-1, n) + (1-\alpha_{short}) \times RSSI(i,n), \text{ for } n=B, \text{omni}$$

3) If $\overline{RSSI_{long}}(i,\text{omni}) > RSSI_{Hold}$ for at least Meas$_{Hold}$ measurements (in omni) and at least Time$_{Hold}$ seconds, then the long term and the short term exponential averages are reset and the client station 12 is sent to the hold state.

4) If $\overline{RSSI_{short}}(i,B) < \overline{RSSI_{long}}(i,B) - \text{Thres}_{ShortVsLong}$ for at least Meas$_{ShortVsLong}$ consecutive measurements in B and at least Time$_{ShortVsLong}$ seconds, then the long term and short term exponential average values are reset and the client station 12 is sent to the rescan state.

5) If $\overline{RSSI_{long}}(i,B) < \overline{RSSI_{long}}(j,\text{omni}) - \text{Thres}_{OmniVsB}$, for at least Meas$_{OmniVsB}$ measurements (in B) and at least Time$_{OmniVsB}$ seconds, where j is the latest omni average RSSI calculated, then both long term and short-term averages are reset and the client station 12 is sent to the rescan state.

6) If the client station 12 in not in a power-saving mode and if the omni-directional and/or directional antenna beam measurements are not available for a certain period of time (Meas_Avail), then the access point 14 goes into the omni-directional antenna pattern 22 for that client station 12, waits until there is data to send or receive, and resets the long term and short term exponential average values and sends the client station to the rescan state.

The conditions on time elapsed (Time$_{Hold}$, Time$_{ShortVsLong}$, Time$_{OmniVsB}$) are event driven, where the event is the receipt of a measurement from the physical layer 43. In other words, the access point 14 will only check if the time elapsed is greater than the specific threshold (Time$_{Hold}$, Time$_{ShortVsLong}$, Time$_{OmniVsB}$) when a measurement is received. This guarantees that the measurements are spread over the entire time interval.

In the rescan state, all averages are reset when entering this state. Similar to the scan state, during the rescan state the access point 14 performs beam scanning and beam classification procedures. However, during this state only the beams in the candidate beam set are scanned.

The output of the re-scanning procedure is a new beam selection, and the client station goes into an active state or an omni-only state, as shown in FIG. 4. There is no change in the beam candidate set during the re-scan state. The beam candidate set is used as an input, and remains the same after the procedure finishes.

During the rescan state, whenever there is data to send to that client station 12, data can be sent using the omni-directional antenna pattern 22. Similar to the scan state, if the access point buffer has too many packets, then the beam scanning procedure should not be run. This is to guarantee that the system throughput performance is not affected by the scanning procedure.

Packets for scanning are only sent when the network 10 is lightly loaded. Lightly loaded is defined to be when the access point buffer occupancy is less than Buffer$_{Threshold}$% of the total buffer size. Moreover, for a given access point 14, the number of scans allowed per beacon period is limited to Max_scan to avoid overload. If the number is exceeded, the scan of this client station 12 is not performed. In both cases, the client station 12 should remain in this state until the rescan can be successfully completed and meanwhile, the omni-directional antenna beam 22 is used to transmit data packets.

A counter is used to count the number of times the client station 12 enters the rescan state. When the client station 12 enters the rescan state for Max_cand_scan times, the counter is reset to zero and the client station is sent to the scan state. In this case, the beam scanning will be performed in all beams and a new best beam and a new candidate set will be selected.

For any given client station 12, the interval in between scans must be greater than Scan_Interval. If the client station 12 enters this state and the last scan/rescan was completed less than Scan_Interval beacon frames ago, then the rescan is not performed and the client station is immediately sent to the omni-only state.

The beam usage rules in the various states will now be discussed. During the initial state, while the client station 12 is performing authentication and association, the access point 14 uses the omni-directional antenna pattern 22 to communicate with that client station.

During the scan and rescan states the access point 14 will be scanning the different beams 20, 22. If the access point buffer is heavily loaded, i.e., the buffer occupancy is less than Buffer$_{Threshold}$% of the total buffer size, then the scanning will be stopped, and resumed only when the buffer occupancy is greater than Buffer$_{Threshold}$% of the total buffer size. In these states, the omni-directional antenna pattern 22 is used to communicate with the client station 12 to send and receive data packets.

During the hold state and the omni-only state, the omni-directional antenna pattern 22 is used. During the active state, the access point 14 preferably uses the directional beams 20 to transmit and receive all packets. However, the reception using a directional beam 20 is only possible when the access point 14 knows which client station 12 is transmitting. This only happens in case an RTS is sent by the client station 12 before the data packet, or when the packets are fragmented.

By definition, all the client stations 12 associated to the access point 14 should be able to hear transmissions fro the access point. However, usage of a directional beam 20 will create the situation where some client stations 12 may be hidden from the access point 14 for certain periods of time.

One method to avoid the client stations 12 from being hidden from the access point 14 is for the access point to send a notification to all client stations 12 in the cell before using a directional beam 20. This notification should be sent using the omni-directional antenna beam 22, informing that the medium will be busy for the next transmission, i.e., setting the duration/NAV appropriately.

In case the packet length is such that the 802.11 protocol itself triggers the RTS/CTS transmission before the data (Packet Length<dot11RTSThreshold), then the access point 14 can send the RTS using the omni-directional antenna beam 22. This will avoid the hidden node problem and then the data itself can be sent using the directional beam 20.

In a mixed environment, where 802.11g networks support 802.11b clients, 802.11g AP needs to send RTS/CTS before each data packet. This protection mechanism can be used to send the RTS/CTS using the omni-directional beam 22.

Hence, there is a case where the packet length is such that RTS/CTS transmission is not triggered (Packet Length<=dot11RTSThreshold) since there is no notification. To solve the problem, before sending any data in a directional beam, the access point 14 sends a short packet notifying all client stations 12 in the area that the medium is busy (by setting the duration field/NAV in the MAC header). The access point 14 may send a CTS-to-Self packet in some cases. This is a very short packet and it does not require a response, so it does not affect the throughput as much as an RTS/CTS exchange would. Then, the data itself can be sent using the directional beam 20.

If the access point 14 where the smart antenna 16 is implemented cannot transmit a CTS-to-self packet, then a dummy packet with a dummy address may be used instead. In this case, no ACK would be sent to that packet, since it is directed to a dummy address.

The use of directional beams 20 will increase the signal strength, and thus allow for higher data rates. This will have an effect of increasing the throughput. However, the need to send a CTS-to-Self packet before every packet transmission will have an effect of decreasing the throughput.

In one embodiment of the antenna switching algorithm 18, the CTS-to-Self packet is sent only for packets larger than Length_Threshold=800 bytes. Any other number of bytes may be used depending on the application. The short packets (shorter than Length_Threshold) may be sent in the omni-directional antenna pattern 22. Enhancements in the antenna steering algorithm 18 include the following. For low loads, there may be no need to use CTS-to-Self since collisions will be very unlikely. The load can be evaluated in the access point via packet success rate.

For high rates, improvements are low. At 54 Mbps, no improvements other than the PER reduction may be expected. A combination of packet sizes may be used, and use the system load and data rate to decide whether or not to include the CTS-to-Self. If a CTS-to-Self is not included, a decision needs to be made as to whether or not to use the directional beam 20.

Every client station 12 has a best beam associated to it. If most client stations 12 are supported by the same beam, then they will hear the directional antenna transmission. Consequently, there is no need to send a CTS-to-Self using the omni-directional directional pattern. If most of the client stations are in a power-saving mode, then there is no need to send a CTS-to-Self.

To determine system efficiency, the following counters available in 802.11 are used by the algorithm: dot11TransmittedFrameCount: Total number of successfully transmitted frames; dot11Failedcount: Total number of frames discarded because the number of retransmissions exceeds the limit; and dot11RetryCount: Total number of frames that require any number of retransmissions in order to be received successfully.

The system efficiency is the determined as a function of the probability of a frame being transmitted successfully at the first attempt, which is given by:

$$P\_Success = \frac{dot11TransmittedFrameCount - dot11RetryCount}{dot11TransmittedFrameCount + dot11FailedCount}$$

If this probability is high, the system is assumed not to be highly loaded.

An enhanced procedure for the antenna steering algorithm 18 will now be discussed. In case an RTS transmission is triggered, the omni-directional antenna beam 22 is used for RTS/CTS and a directional antenna beam 20 is used for the data frames.

Otherwise, if there is no RTS/CTS transmission, and if P_success<P_Success_Required (this means that the system is probably not highly loaded and a CTS-to-Self is not needed) (P_Success_Required=95%, for example.), then all packets are sent in a directional beam 20 without a CTS-to-Self. When the system is highly loaded, if more than X % of the client stations 12 in the system are supported by the same beam or if more than X % of the client stations are in a power-saving mode (there are probably not many hidden nodes and a CTS-to-Self is not needed), then all packets are sent in a directional beam 20 without a CTS-to-Self.

Otherwise, if client stations 12 are not in the same beam or in a power-saving mode, there might be hidden nodes. If packet length<threshold, then the packet is sent in the omni-directional antenna pattern 22. Otherwise, a CTS-to-Self is sent using the omni-directional antenna beam 22 and the packet is sent in a directional beam 20. When the CTS-to-Self is sent, it may be transmitted at a reduced power and at a low data rate to reduce interference to other access points.

Another option is to not use a directional beam with high rates, since gains are small (at 54 Mbps, for example, rates cannot be increased). However, there is still a reduction on PER. A CTS-to-Self transmission using the omni-directional antenna bam 22 may thus be dependent on data rates.

Figure 7:
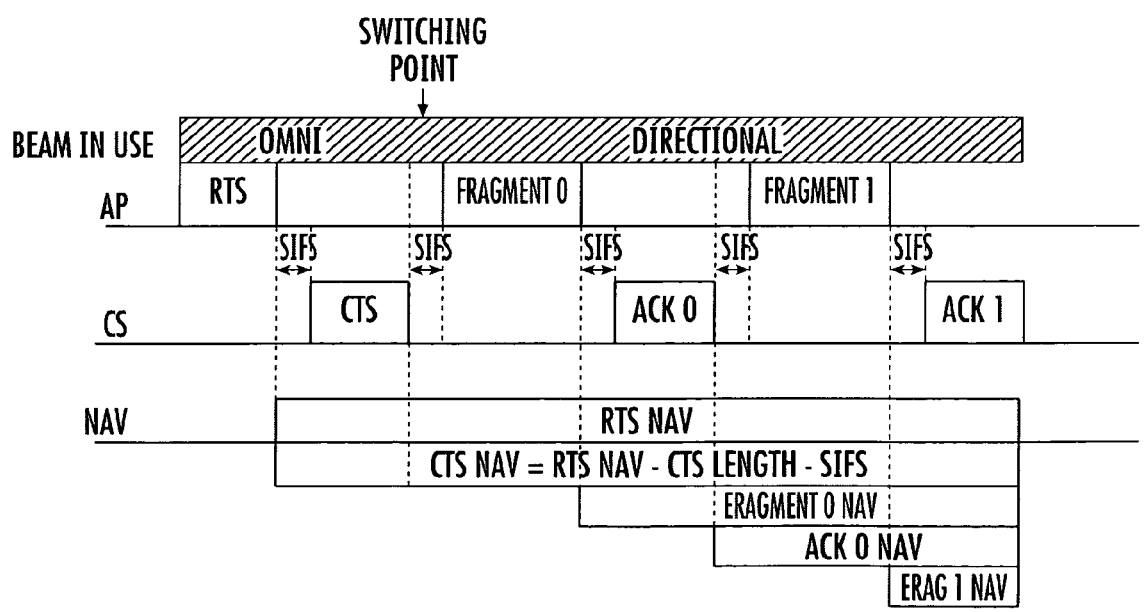
Figure 8:
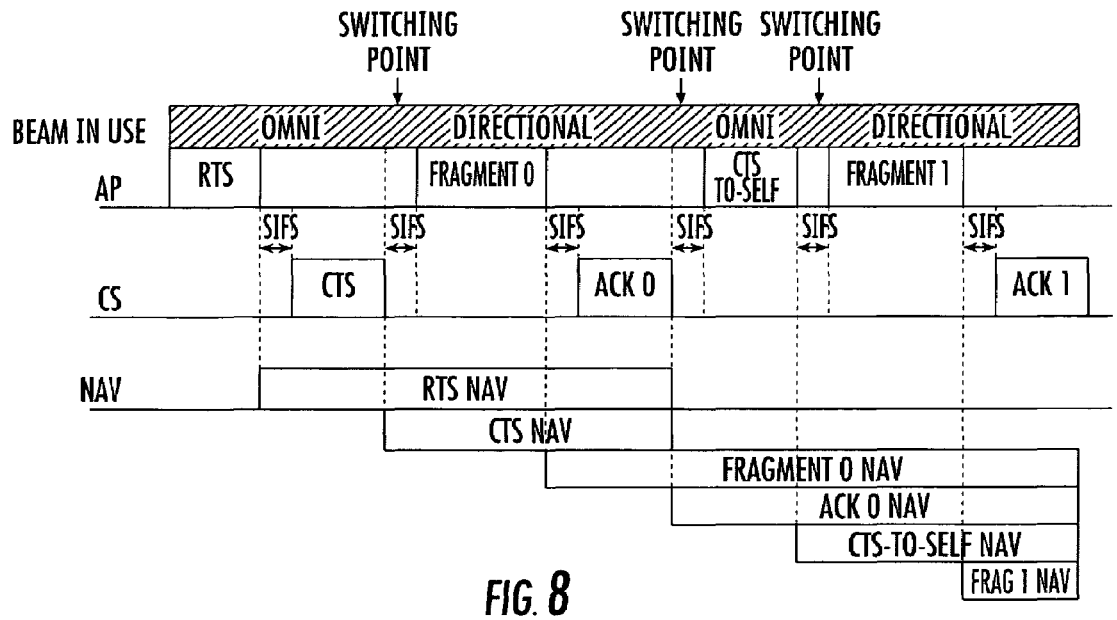
Figure 9:
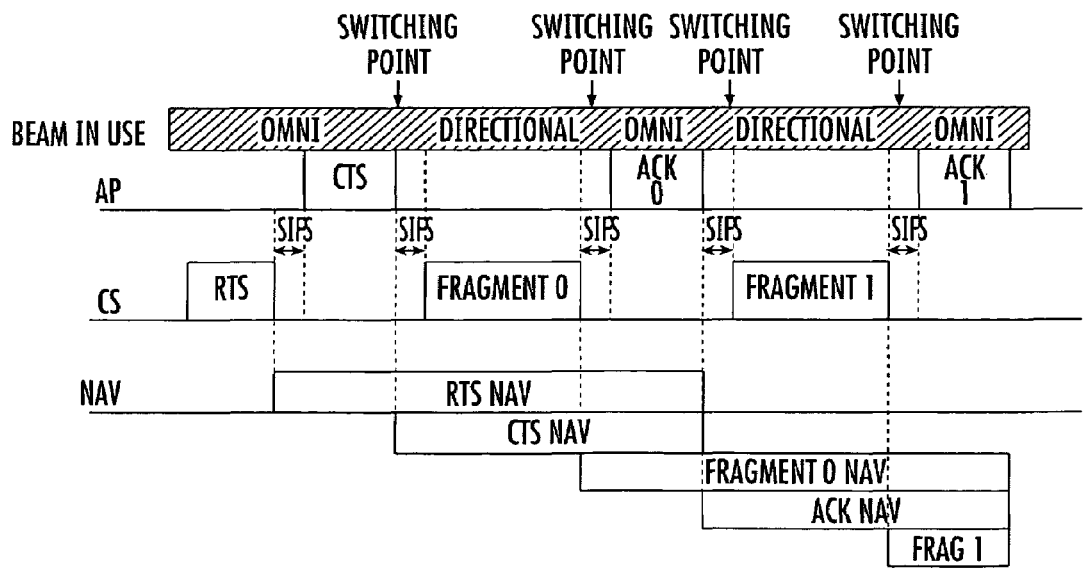
FIG. 9 is a sequence diagram illustrating usage rules in the WLAN during access point data reception in accordance with the present invention.

Referring now to FIGS. 6-9, the usage rules for the antenna steering algorithm 18 will be discussed in greater detail. The active state is divided in 3 modes: an idle mode, an AP data transmission mode (FIGS. 6-8) and an AP data reception mode (FIG. 9). They are discussed separately in the following sections. The usage rules during the idle mode are as follows. When the access point 14 has no data to send/receive, the access point uses the omni-directional antenna pattern 22 to listen to the medium and wait for packets. In other words, the "default" mode is omni.

The usage rules during the AP data transmission mode are as follows. This scenario is divided in two cases, depending on whether or not the RTS/CTS transmission is triggered by the 802.11 protocol. Case 1: Packet Length<=dot11RTSThreshold which means that RTS/CTS transmission is not triggered. Case 2: Packet Length<dot11RTSThreshold which means that RTS/CTS transmission is triggered before the actual data is sent.

Figure 6:
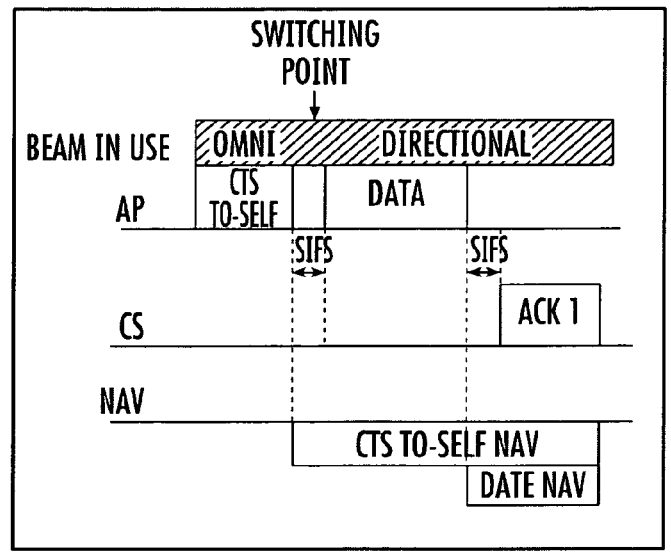
FIGS. 6-8 are sequence diagrams illustrating usage rules in the WLAN during access point data transmission in accordance with the present invention.

For Case 1, there is no RTS/CTS transmission. If the CTS-to-Self transmission is triggered (according to rules above), then the CTS-to-Self packet is sent before the data frame using the omni-directional antenna pattern 22. The data frame is sent using the directional antenna pattern 20. The ACK is received using the directional antenna 20. This procedure is referred to as CTS-to-Self protection and is shown in FIG. 6.

If the CTS-to-Self transmission is not triggered, then the packet should be transmitted using either a directional beam 20 or the omni-directional antenna beam 22 according to the rules described above. The preliminary rule is to transmit short packets using the omni-directional beam 22 and long packets (larger than Length_Threshold) using the CTS-to-Self protection.

For case 2, there is an RTS/CTS Transmission. An RTS is sent using the omni-directional antenna beam 22 and the data frame is sent using the directional beam 20. In case of fragmentation, there are two options.

In the first option, the duration field in the RTS header will be set to include all fragments that need to be sent. This requires change in the way the duration is calculated in the access point 14, but no changes are needed in the client station 12 side. An example of this option is illustrated in FIG. 7.

In the second option, the duration calculation does not change. Instead, a CTS-to-Self packet is inserted in between fragments. An example of this option is illustrated in FIG. 8.

Usage rules during AP data reception will now be discussed. During data reception, there is no issue regarding hidden node. Thus, the access point 14 should use the directional beam 20 as often as possible. However, the access point 14 needs to receive packets in the omni-directional beam 22 to perform measurements (beam monitoring) and compare with directional beam.

Thus, the following rules are defined. When an RTS is received from the client station 12, the access point 14 will switch to the best beam immediately after sending the CTS. If fragmentation is used by the client station 12, the access point 14 will switch to the best beam to receive every fragment after the first fragment. In case RTS was received, the access point 14 will receive the first fragment also in a directional beam 20. The access point 14 will send CTS and ACK in the omni-directional beam 22 to reduce the hidden node probability.

Usually, the threshold for RTS/CTS transmission is the same as the threshold for fragmentation. However, in the cases where they are not the same, fragmentation might happen without RTS/CTS exchange. In this case, the access point 14 will receive the first fragment in the omni-directional beam 22 and then the following fragments in a directional beam 20. ACKs should still be sent in the omni-directional beam 22. FIG. 9 shows an example of AP data reception in the case where RTS/CTS exchange is required.

There are two cases that forcing the smart antenna 16 into the omni-directional antenna beam 22 to perform measurements. A first case is during an active state. If the access point 14 receives more than M_dir consecutive packets in a directional beam 20 from a given client station 12, then the algorithm 18 will force one packet to be received in the omni-directional pattern 22 after every packet received in a directional beam 20, until it receives $Meas_{OmniVsb}$ packets in omni.

This allows the access point 14 to calculate long-term average RSSI (in omni) and compare it with directional beam. In the active state, if $\overline{RSSI_{long}}(i,B) < \overline{RSSI_{long}}(j,omni) - Thres_{OmniVsb}$, for at least $Meas_{OmniVsB}$ measurements (in B) and at least $Time_{OmnivsB}$ seconds, where j is the latest omni average RSSI calculated, then both long-term and short-term averages are reset and the client station 12 is sent to a rescan state. This problem (no omni measurements) will happen when there is large downlink transmission and no uplink transmission.

Every time the medium becomes "free" (NAV expires), if the antenna 16 is positioned with a directional beam, then the antenna should be set to the omni-directional mode. This is done in order to handle error cases. For example, if the access point 14 sends a packet and is waiting for an ACK, but the ACK is not received, then after the NAV expires the access point should be set to omni, since any other client could be transmitting after the NAV expires. This is because the medium becomes free for contention at that point in time.

Reducing collisions during beam scanning is helped when the algorithm 18 starts in the omni-directional antenna beam 22. The access point 14 transmits an RTS in the omni-directional beam 22 and waits for a CTS in omni-directional beam. If a CTS is not received after a CTSTimeout interval, then a backoff and retry (i.e., follow 802.11 retransmission rules for this first step) are performed. The duration in the RTS packet (RTS NAV) is set to include all packets that will be needed for scanning.

Once a CTS is received in omni, the antenna 16 is rotated and every beam is visited. At every visit, RSSI is measured in each beam (once per visit). RSSI measurement in a given beam is done by sending an RTS packet in omni and receiving the CTS packet in the directional beam.

Figure 10:
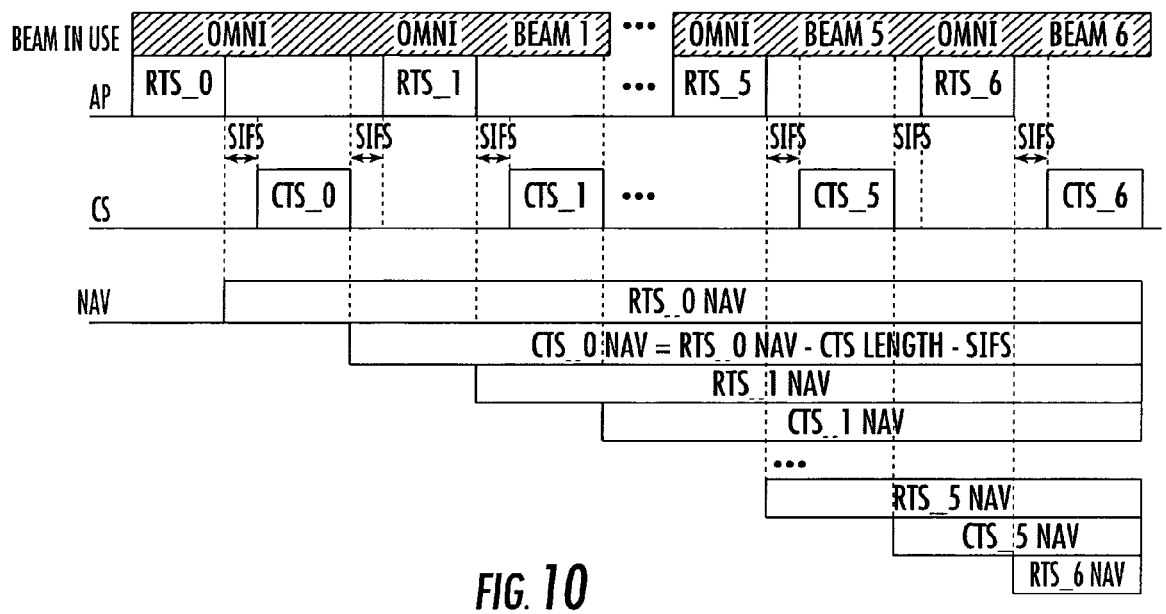
FIG. 10 is a sequence diagram illustrating the reduction of collisions during beam scanning in accordance with the present invention.

At every RTS transmission, the duration is recalculated. If a new duration is larger than old duration, then the new duration is used. The M_scan times are repeated. This method is illustrated in FIG. 10. This method requires that data transmission be stopped during a full rotation. This might affect throughput. Also, This requires change in the way packets are transmitted, since in this method there is no backoff in between RTS/CTS packets, only SIFS in between packets.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for operating an access point in an 802.11 wireless communication network communicating with at least one client station, the access point comprising a smart antenna for generating antenna beams including a plurality of directional antenna beams and an omni-directional antenna beam, the method comprising:
   scanning the plurality of directional antenna beams and the omni-directional antenna beam for receiving signals from the at least one client station;
   measuring the signals received via each scanned antenna beam;
   repeating the scanning and measuring n times for each antenna beam, and if one of the antenna beams does not receive signals from the at least one client station at least a portion of the n times, then that antenna beam is ignored during a remainder of the scanning and measuring; and
   selecting one of the plurality of antenna beams based upon the measuring for communicating with the at least one client station.

2. A method according to claim 1 further comprising calculating for each scanned antenna beam an average measurement of the plurality of measurements associated therewith; and wherein the selecting is based upon the average measurements.

3. A method according to claim 1 wherein the scanning comprises:
selecting one of the plurality of antenna beams to be scanned;
transmitting a request-to-send (RTS) packet to the at least one client station;
receiving a clear-to-send (CTS) packet via the selected antenna beam from the at least one client station; and
repeating the transmitting, selecting and receiving for the other antenna beams.

4. A method according to claim 3 wherein the RTS packet is transmitted via the omni-directional antenna beam.

5. A method according to claim 3 wherein if one of the antenna beams does not receive the CTS packet from the at least one client station at least a portion of the n times, then that antenna beam is ignored during a remainder of the transmitting and selecting.

6. A method according to claim 1 wherein the scanning comprises:
selecting one of the plurality of antenna beams to be scanned;
transmitting a dummy packet to the at least one client station;
receiving an acknowledgement via the selected antenna beam from the at least one client station; and
repeating the transmitting, selecting and
receiving for the other antenna beams.

7. A method according to claim 6 wherein the dummy packet comprises a packet with a MAC header and no data.

8. A method according to claim 6 wherein if one of the antenna beams does not receive the acknowledgement from the at least one client station at least a portion of the n times, then that antenna beam is ignored during a remainder of the transmitting and selecting.

9. A method according to claim 1 wherein the measuring comprises determining at least one of a received signal strength indicator (RSSI) and a signal-to-noise ratio of the received signals.

10. A method according to claim 1 further comprising the following before the scanning is performed:
selecting the omni-directional antenna beam for receiving signals from the at least one client station;
measuring the signals received via the omni-directional antenna beam; and
comparing the measured signals to a scan threshold, and if the measured signals is less than the scan threshold, then performing the scanning.

11. A method according to claim 10 wherein the access point waits a predetermined amount of time before performing the scanning so that the at least one client station can perform its own scanning.

12. A method according to claim 1 further comprising the following before the scanning is performed:
selecting the omni-directional antenna beam; and authenticating and associating the at least one client station with the access point.

13. A method according to claim 1 further comprising re-scanning at least a portion of the plurality of directional antenna beams and re-measuring the signals received via each scanned antenna beam after selecting an antenna beam for communicating with the at least one client station.

14. A method according to claim 13 wherein the selected antenna beam comprises a directional antenna beam, and wherein initiation of the re-scanning and the re-measuring is based upon the following:
performing a plurality of measurements for signals received via the selected directional antenna beam from the at least one client station;
switching to the omni-directional antenna beam and performing a plurality of measurements for signals received from the at least one client station;
comparing the measured signals for the omni-directional antenna beam to the measured signals for the selected directional antenna beam; and
performing the re-scanning and the re-measuring based upon the comparing.

15. A method according to claim 1 further comprising transmitting a CTS-to-self packet using the omni-directional antenna beam prior to transmitting data to the at least one client station using the selected antenna beam.

16. A method according to claim 1 further comprising transmitting an RTS packet using the omni-directional antenna beam prior to transmitting data to the at least one client station using the selected antenna beam.

17. A method according to claim 16 wherein if the transmitted data is fragmented, then further comprising transmitting a CTS-to-self packet using the omni-directional antenna beam between fragments.

18. A method according to claim 1 wherein if an RTS packet is received from said at least one client station, then further comprising transmitting a CTS packet, and switching to the antenna beam selected for communicating with the at least one client station for receiving data therefrom.

19. A method according to claim 18 wherein if the selected antenna beam comprises a directional antenna beam for receiving the data, and if the received data is fragmented, then further comprising transmitting an acknowledgment using the omni-directional antenna beam between the received fragments.

20. A method according to claim 1 wherein the selected antenna beam is a directional antenna beam, and if the access point is in a contention free period (CFP), then the directional antenna beam is used to receive data from the at least one client station.

21. A method according to claim 1 wherein if the selected antenna beam comprises a directional antenna beam and more than a predetermined number of consecutive data packets are received in the selected directional beam from the at least one client station, then further comprising switching between the selected directional antenna beam and the omni-directional antenna beam for alternating reception of additional consecutive data packets.

22. A method according to claim 1 wherein if the selected antenna beam comprises a directional antenna beam, and a network allocation vector (NAV) associated with the at least one client station expires, then further comprising switching to the omni-directional antenna beam.

23. A method according to claim 1 wherein the selected antenna beam comprises a directional antenna beam; and further comprising the following in response to an RTS packet transmission:
using the omni-directional antenna beam for receiving a CTS packet from the at least one client station; and
using the selected directional antenna beam for data transmissions to the at least one client station.

24. A method according to claim 1 wherein the selected antenna beam comprises a directional antenna beam; and if there are no RTS/CTS transmissions by the access point, and if the network is lightly loaded then data packets are transmitted by the access point using the selected directional beam.

25. A method according to claim 24 wherein if the network is highly loaded, and if more than 1 predetermined percentage of the client stations in the network are supported by the same beam or if more than a predetermined percentage of the client stations are in a power-saving mode then the data packets are transmitted using the selected directional antenna beam.

26. A method according to claim 24 wherein if the network is highly loaded, and if more than a predetermined percentage of the client stations in the system are not supported by the same bean and if more than a predetermined percentage of the client stations are not in a power-saving mode, then a data packet length is less than a threshold, the data packet is transmitted using the omni-directional antenna beam, otherwise if a data packet length is greater than the threshold, a CTS-to-Self packet is transmitted before the data packet using the omni-directional antenna beam and the data packet is sent in the selected directional beam.

27. A method according to claim 26 wherein transmission of the CTS-to-Self packet using the omni-directional antenna beam is dependent on a data rate of the data packets.

28. A method according to claim 26 wherein transmission of the CTS-to-Self packet is at a reduced power and at a low data rate to reduce interference to other access points.

29. An access point for operating in an 802.11 wireless communication network, and comprising:
a smart antenna for generating antenna beams including a plurality of directional antenna beams and an omni-directional antenna beam;
a beam switching unit coupled to said smart antenna;
a transceiver coupled to said beam switching unit for receiving signals from at least one client, and comprising a measurement unit for measuring the received signals; and
an antenna steering algorithm module for running an antenna steering algorithm for
operating said beam switching unit for scanning the plurality of directional antenna beams and the omni-directional antenna beam for receiving signals from the at least one client station,
receiving the measured signals from said measurement unit for each scanned antenna beam, and
repeating the scanning and measuring n times for each antenna beam, and if one of the antenna beams does not receive signals from the at least one client station at least a portion of the n times, then that antenna beam is ignored during a remainder of the scanning and measuring, and
selecting one of the plurality of antenna beams based upon the measured signals for communicating with the at least one client station.

30. An access point according to claim 29 wherein said antenna steering algorithm also calculates for each scanned antenna beam an average measurement of the plurality of measurements associated therewith, and wherein the selecting is based upon the average measurements.

31. An access point according to claim 29 wherein the scanning is based upon:
said antenna steering algorithm module selecting one of the plurality of antenna beams to be scanned;
said transceiver transmitting a request-to-send (RTS) packet to the at least one client station;
said transceiver receiving a clear-to-send (CTS) packet via the selected antenna beam from the at least one client station; and
said transceiver and said antenna steering algorithm repeating the transmitting, selecting and receiving for the other antenna beams.

32. An access point according to claim 31 wherein the RTS packet is transmitted via the omni-directional antenna beam.

33. An access point according to claim 31 wherein the if one of the antenna beams does not receive the CTS packet from the at least one client station at least a portion of the n times, then that antenna beam is ignored during a remainder of the transmitting and selecting.

34. An access point according to claim 29 wherein the scanning is based upon:
said antenna steering algorithm module selecting one of the plurality of antenna beams to be scanned;
said transceiver transmitting a dummy packet to the at least one client station;
said transceiver receiving an acknowledgement via the selected antenna beam from the at least one client station; and
said transceiver and said antenna steering algorithm repeating the transmitting, selecting and receiving for the other antenna beams.

35. An access point according to claim 34 wherein if one of the antenna beams does not receive the acknowledgement from the at least one client station at least a portion of the n times, then that antenna beam is ignored during a remainder of the transmitting and selecting.

36. An access point according to claim 29 wherein said measurement unit determines at least one of a received signal strength indicator (RSSI) and a signal-to-noise ratio of the received signals.

37. An access point according to claim 29 further comprising the following before the scanning is performed:
said beam switching unit selecting the omni-directional antenna beam for receiving signals from the at least one client station;
said measurement unit measuring the signals received via the omni-directional antenna beam; and
said antenna steering algorithm comparing the measured signals to a scan threshold, and if the measured signals is less than the scan threshold, then performing the scanning.

38. An access point according to claim 29 further comprising the following before the scanning is performed:
said beam switching unit selecting the omni-directional antenna beam; and
said antenna steering algorithm authenticating and associating the at least one client station with the access point.

39. An access point according to claim 29 further comprising re-scanning at least a portion of the plurality of directional antenna beams and re-measuring the signals received via each scanned antenna beam after selecting an antenna beam for communicating with the at least one client station.

40. An access point according to claim 39 wherein if the selected antenna beam comprises a directional antenna beam, and the WLAN is in a contention free period (CFP), then further comprising:
said measurement unit performing a plurality of measurements for signals received via the selected directional antenna beam from the at least one client station;
said beam switching unit switching to the omni-directional antenna beam so that said measurement unit performs a plurality of measurements for signals received from the at least one client station; and said antenna steering algorithm comparing the measured signals for the omni-directional antenna beam to the measured signals for the selected directional antenna beam, and performing the re-scanning and the re-measuring of the antenna beams based upon the comparing.

41. An access point according to claim 29 wherein said transceiver transmits a CTS-to-self packet using the omni-directional antenna beam prior to transmitting data to the at least one client station using the selected antenna beam.

42. An access point according to claim 29 wherein said transceiver transmits an RTS packet using the omni-directional antenna beam prior to transmitting data to the at least one client station using the selected antenna beam.

43. An access point according to claim 42 wherein if said transceiver transmits fragmented data, then said transceiver transmits a CTS-to-self packet using the omni-directional antenna beam between fragments.

44. An access point according to claim 29 wherein if said transceiver receives an RTS packet from said at least one client station, then said transceiver transmits a CTS packet, and said beam switching unit switches to the antenna beam selected for communicating with the at least one client station for receiving data therefrom.

45. An access point according to claim 44 wherein if the selected antenna beam comprises a directional antenna beam for receiving the data, and if said transceiver receives fragmented data, then said transceiver transmits an acknowledgment using the omni-directional antenna beam between the received fragments.

46. An access point according to claim 29 wherein if the selected antenna beam comprises a directional antenna beam and said transceiver receives more than a predetermined number of consecutive data packets from the at least one client station, then said beam switching unit switches between the selected directional antenna beam and the omni-directional antenna beam for alternating reception of additional consecutive data packets.

47. An access point according to claim 29 wherein if the selected antenna beam comprises a directional antenna beam and an NAV associated with the at least one client station expires, then said beam switching unit switches to the omni-directional antenna beam.

* * * * *

UNITED STATES PATENT AND TRADEMARK OFFICE
CERTIFICATE OF CORRECTION

PATENT NO. : 7,366,464 B2
APPLICATION NO. : 11/144113
DATED : April 29, 2008
INVENTOR(S) : Iacono et al.

It is certified that error appears in the above-identified patent and that said Letters Patent is hereby corrected as shown below:

| | |
|---|---|
| Column 6, Line 67 | Delete: "way"<br>Insert: --away-- |
| Column 10, Line 15 | Delete: "t"<br>Insert: --T-- |
| Column 12, Line 59 | Delete: "fro"<br>Insert: --from-- |
| Column 13, Line 5 | Delete: "<"<br>Insert: -->-- |
| Column 14, Line 18 | Delete: "<"<br>Insert: -->-- |
| Column 14, Line 41 | Delete: "bam"<br>Insert: --beam-- |
| Column 14, Line 58 | Delete: "<"<br>Insert: -->-- |
| Column 16, Line 30 | Delete: "T"<br>Insert: --t-- |

UNITED STATES PATENT AND TRADEMARK OFFICE
CERTIFICATE OF CORRECTION

PATENT NO.        : 7,366,464 B2
APPLICATION NO.   : 11/144113
DATED             : April 29, 2008
INVENTOR(S)       : Iacono et al.

It is certified that error appears in the above-identified patent and that said Letters Patent is hereby corrected as shown below:

Column 19, Line 11        Delete: "bean"
                          Insert: --beam--

Signed and Sealed this

Fifth Day of August, 2008

JON W. DUDAS
*Director of the United States Patent and Trademark Office*